US012394582B2

(12) United States Patent
Muniyappan et al.

(10) Patent No.: US 12,394,582 B2
(45) Date of Patent: Aug. 19, 2025

(54) MULTI-PART MOVING SHAFT ASSEMBLY FOR ULTRA HIGH SPEED ACTUATOR USED IN A HYBRID CIRCUIT BREAKER

(71) Applicant: EATON INTELLIGENT POWER LIMITED, Dublin (IE)

(72) Inventors: Jayaraman Muniyappan, Pernambut (IN); Robert Michael Slepian, Murrysville, PA (US); Santhosh Kumar Chamarajanagar Govinda Nayaka, Moon Township, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 344 days.

(21) Appl. No.: 18/086,891

(22) Filed: Dec. 22, 2022

(65) Prior Publication Data

US 2024/0212957 A1 Jun. 27, 2024

(51) Int. Cl.
*H01H 33/666* (2006.01)
*H01H 33/662* (2006.01)

(52) U.S. Cl.
CPC .. *H01H 33/6661* (2013.01); *H01H 33/66207* (2013.01)

(58) Field of Classification Search
CPC ......... H01H 33/6661; H01H 33/66207; H01H 33/285; H01H 33/34; H01H 2033/323;
(Continued)

(56) References Cited

U.S. PATENT DOCUMENTS 5,808,258 A * 9/1998 Luzzi ............... H01H 33/66207 218/138
7,829,814 B2 * 11/2010 Marchand .......... H01H 33/6661 218/140

(Continued)

FOREIGN PATENT DOCUMENTS

| | | | |
|---|---|---|---|
| CN | 110 957 154 | A | 4/2020 |
| EP | 2 551 880 | A2 | 1/2013 |
| JP | H11 40013 | A | 2/1999 |

OTHER PUBLICATIONS

European Patent Office "Invitation to Pay Additional Fees and, Where Applicable, Protest Fee accompanied with Annex to Form PCT/ISA/206 Communication Relating to the Results of the Partial International Search Report", from corresponding International Application No. PCT/EP2023/025554, Apr. 16, 2024, 15 pp.

*Primary Examiner* — William A Bolton
(74) *Attorney, Agent, or Firm* — Eckert Seamans Cherin & Mellott, LLC

(57) ABSTRACT

Multi-part assemblies for driving a movable conductor away from a stationary conductor of a circuit interrupter decrease separable contact opening time by reducing the number of components that must travel during an initial stage of an opening stroke to achieve an initial gap between the separable contacts. The components that must travel in order to open the separable contacts are included in only some portions of the movable assembly, rather than all portions. In one embodiment, a split switch shaft coupled to a movable conductor includes a head shaft coupled to a tail shaft using a sliding pin, enabling the head shaft to travel an initial distance while the tail shaft remains stationary, thus achieving an initial gap between the contacts. In another embodiment, the movable conductor assembly is coupled to hydraulics, enabling the assembly to travel an initial distance at high speeds before damping by the hydraulic fluid.

13 Claims, 8 Drawing Sheets

(58) Field of Classification Search
CPC H01H 3/54; H01H 3/222; H01H 3/38; H01H 3/32; H01H 2003/323; H01H 2003/266; H01F 7/06
USPC .......................... 218/121, 140, 141, 153, 154
See application file for complete search history.

(56) References Cited

U.S. PATENT DOCUMENTS

| | | | | |
|---|---|---|---|---|
| 8,426,759 | B2 * | 4/2013 | Nagatake | H01H 1/50 218/120 |
| 8,933,358 | B2 * | 1/2015 | Yang | H01H 33/666 218/120 |
| 10,580,599 | B1 | 3/2020 | Wang et al. | |
| 10,923,298 | B1 * | 2/2021 | Chen | H01H 33/6662 |
| 10,923,304 | B1 * | 2/2021 | Juds | H01H 51/01 |
| 11,152,174 | B2 | 10/2021 | Leccia et al. | |
| 11,183,348 | B1 | 11/2021 | Leccia et al. | |
| 11,227,729 | B1 * | 1/2022 | Rakus | F16F 9/535 |
| 11,328,884 | B2 * | 5/2022 | Zhou | H01H 33/666 |
| 11,348,751 | B2 | 5/2022 | Wang et al. | |
| 2009/0071811 | A1 | 3/2009 | van Dijk et al. | |
| 2022/0139654 | A1 | 5/2022 | Holp et al. | |
| 2022/0270839 | A1 | 8/2022 | Gottschalk et al. | |
| 2022/0344115 | A1 | 10/2022 | Das et al. | |

* cited by examiner

MULTI-PART MOVING SHAFT ASSEMBLY FOR ULTRA HIGH SPEED ACTUATOR USED IN A HYBRID CIRCUIT BREAKER

FIELD OF THE INVENTION

The disclosed concept relates generally to circuit interrupters, and in particular, to shaft assemblies used with movable conductor assemblies to open separable contacts of circuit interrupters at high speeds.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit interrupters typically include mechanically separable electrical contacts, which operate as a mechanical switch. When the separable contacts are in a closed state such that they are in contact with one another, current is able to flow through any circuits connected to the circuit interrupter. When the separable contacts are in an open state such that they are physically separated from one another, current is prevented from flowing through any circuits connected to the circuit interrupter. The separable contacts may be operated either manually by way of an operator handle, remotely by way of an electrical signal, or automatically in response to a detected fault condition. Typically, such circuit interrupters include an actuator designed to rapidly open or close the separable contacts, and a trip mechanism, such as a trip unit, which can sense a number of fault conditions and automatically trip the actuator to open the separable contacts upon sensing a fault condition.

Hybrid circuit interrupters employ a power electronic interrupter in addition to the mechanical separable contacts. The electronic interrupter is connected in parallel with the mechanical contacts, and comprises electronics structured to commutate current after a fault is detected. Once current is commutated from the mechanical switch to the electronic interrupter, the mechanical separable contacts are able to separate with a reduced risk of arcing. It is advantageous to commutate as much current as possible to the electronic branch as quickly as possible and to open the mechanical separable contacts at fast speeds in order to limit the let-through current during a fault condition.

Mechanical separable contacts typically comprise one stationary contact disposed at the end of a stationary electrode stem, and one movable contact disposed at the end of a movable electrode stem, with the electrode stem being a component of a larger movable conductor assembly. The force required to open mechanical separable contacts quickly can be significant due to the mass of the movable conductor assembly and associated shaft assembly that must be driven open in order to separate the separable contacts during a fault condition. Thomson coil actuators are noted for their ability to open mechanical separable contacts at very high speeds, and are often employed in hybrid circuit interrupters. However, because the lapse of any time between the occurrence of a fault condition and the opening of the mechanical separable contacts leads to at least some current passing through the mechanical separable contacts, there is always a need for movable conductor assemblies and associated switch shaft assemblies that have a lower mass than existing assemblies have, to facilitate faster opening of the mechanical contacts.

There is thus room for improvement in movable conductor assemblies and associated switch shaft assemblies used for opening separable contacts of circuit interrupters at high speeds.

SUMMARY OF THE INVENTION

These needs, and others, are met by multi-part assemblies that drive a movable conductor of a circuit interrupter away from a stationary conductor. Producing the driving assemblies as multi-part assemblies rather than a unitary body assembly decreases separable contact opening time by reducing the number of components that must travel during an initial stage of an opening stroke in order to achieve an initial gap between the separable contacts. In one embodiment, a multi-part split shaft assembly structured to be coupled to a movable conductor assembly includes a head shaft coupled to a tail shaft. The head shaft and tail shaft are coupled together using a sliding pin, which enables the head shaft to travel an initial distance during an opening stroke while the tail shaft remains stationary. This achieves an initial gap between the separable contacts while requiring only the head shaft to travel the initial opening distance, rather than both the head shaft and the tail shaft. In additional embodiments, the movable assembly includes a first portion and a second portion. During an opening stroke, only the first portion needs to travel in order to achieve an initial gap between the separable contacts, while the components in the second portion remain stationary. This achieves an initial gap between the separable contacts while requiring only the first portion of the movable assembly to travel the initial opening distance, rather than both the first portion and the second portion.

In accordance with one aspect of the disclosed concept, a split switch shaft is structured for use in a pole assembly of a circuit interrupter. The pole assembly comprises a stationary conductor with a stationary separable contact and a movable conductor assembly with a movable separable contact, with the movable conductor assembly being structured to travel in an opening direction from a closed state during an opening stroke in order to separate the movable separable contact from the stationary separable contact. The split switch shaft comprises: a head shaft structured to be coupled at its proximal end to the movable conductor assembly, a sliding pin, a tail shaft, and a reset spring. The head shaft includes a first pin receiving opening extending laterally through a distal end of the head shaft. The tail shaft comprises a proximal end coupled to the head shaft distal end and a second pin receiving opening extending laterally through the tail shaft proximal end. The tail shaft proximal end includes a plurality of spring mount ledges and a shaft-coupling opening disposed between the spring mount ledges. The reset spring is mounted on the spring mount ledges. The head shaft distal end is inserted into the tail shaft proximal end such that the first and second pin receiving openings are aligned. The sliding pin is inserted into the first and second pin receiving openings, and the reset spring maintains a minimum clearance distance between a distal-most surface of the head shaft and a distal surface of the shaft-coupling opening. The second pin receiving opening is longer than the first pin receiving opening, and the head shaft is structured to travel the minimum clearance distance in the opening direction when the movable conductor assembly travels the minimum clearance distance during an opening stroke. The tail shaft is structured to remain stationary when the movable conductor assembly travels the minimum clearance distance from a closed state during an opening stroke.

In accordance with another aspect of the disclosed concept, a pole assembly for a circuit interrupter comprises: a stationary conductor with a stationary separable contact, a movable conductor assembly with a movable separable contact, a Thomson coil actuator, and a split switch shaft. The Thomson coil actuator is structured to cause the movable conductor assembly to travel in an opening direction from a closed state during an opening stroke in order to separate the movable separable contact from the stationary separable contact. The split switch shaft comprises: a head shaft structured to be coupled at its proximal end to the movable conductor assembly, a sliding pin, a tail shaft, and a reset spring. The head shaft includes a first pin receiving opening extending laterally through a distal end of the head shaft. The tail shaft comprises a proximal end coupled to the head shaft distal end and a second pin receiving opening extending laterally through the tail shaft proximal end. The tail shaft proximal end includes a plurality of spring mount ledges and a shaft-coupling opening disposed between the spring mount ledges. The reset spring is mounted on the spring mount ledges. The head shaft distal end is inserted into the tail shaft proximal end such that the first and second pin receiving openings are aligned. The sliding pin is inserted into the first and second pin receiving openings, and the reset spring maintains a minimum clearance distance between a distal-most surface of the head shaft and a distal surface of the shaft-coupling opening. The second pin receiving opening is longer than the first pin receiving opening, and the head shaft is structured to travel the minimum clearance distance in the opening direction when the movable conductor assembly travels the minimum clearance distance during an opening stroke. The tail shaft is structured to remain stationary when the movable conductor assembly travels the minimum clearance distance from a closed state during an opening stroke.

In accordance with a further aspect of the disclosed concept, a multi-part moving assembly is structured for use in a pole assembly of a circuit interrupter. The pole assembly comprises a stationary conductor with a stationary separable contact and a movable conductor assembly with a movable separable contact, with the movable conductor assembly being structured to travel in an opening direction from a closed state during an opening stroke in order to separate the movable separable contact from the stationary separable contact. The multi-part moving assembly comprises: a piston structured to be coupled at its proximal end to the movable conductor assembly, a hydraulic enclosure housing hydraulic fluid, a reset spring coupled to a proximal surface of a distal end of the hydraulic enclosure, and a switch shaft coupled at its proximal end to the distal end of the hydraulic enclosure. The piston includes a connecting rod and a crown extending distally from a distal end of the connecting rod. The hydraulic fluid sits on a proximal surface of a distal end of the hydraulic enclosure, and the reset spring is structured such that, in an uncompressed state, a proximal end of the reset spring extends proximally out of the hydraulic fluid. A distal end of the piston crown engages a proximal end of the reset spring, and the reset spring maintains a minimum clearance distance between a distal-most surface of the piston crown and a proximal surface of the hydraulic fluid. The piston is structured to travel the minimum clearance distance in an opening direction when the movable conductor assembly travels the minimum clearance distance from a closed state during an opening stroke, and the hydraulic enclosure is structured to remain stationary when the movable conductor assembly travels the minimum clearance distance from the closed state during an opening stroke.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
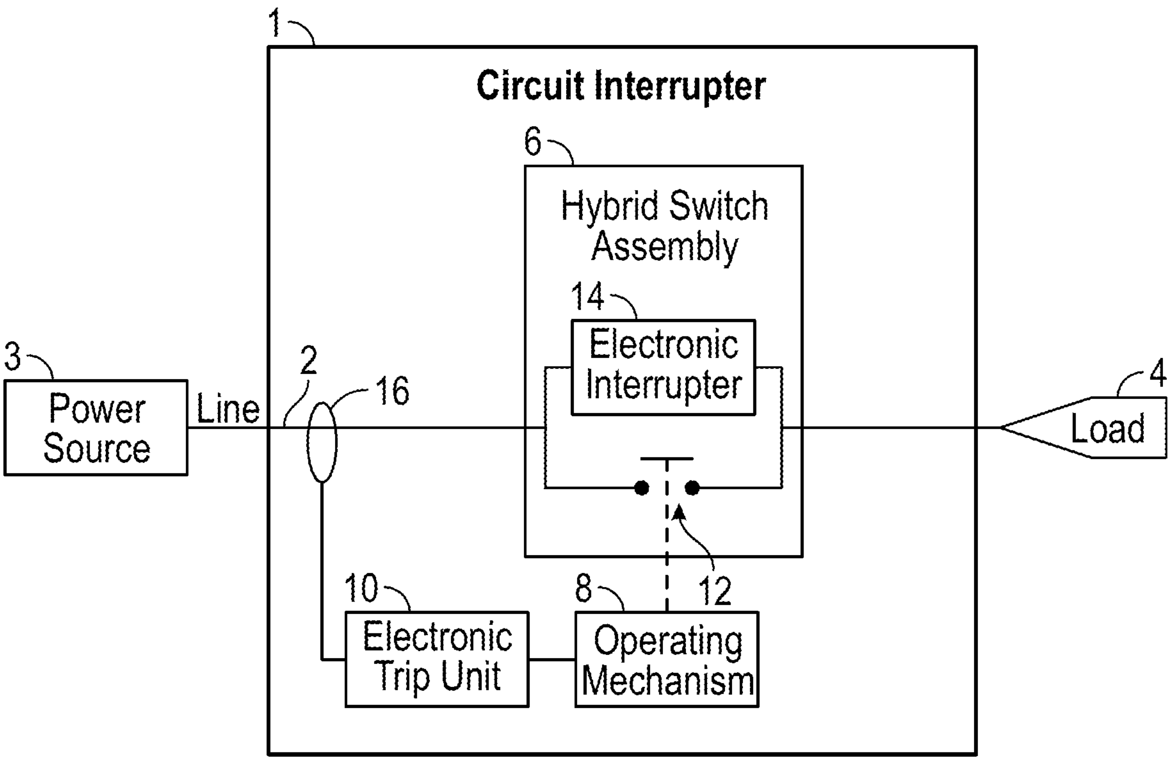
FIG. 1 is a schematic diagram of hybrid circuit interrupter, in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, when ordinal terms such as "first" and "second" are used to modify a noun, such use is simply intended to distinguish one item from another, and is not intended to require a sequential order unless specifically stated.

As employed herein, the term "number" shall mean one or an integer greater than one (i.e., a plurality).

As employed herein, the term "processing unit" or "processor" shall mean a programmable analog and/or digital device that can store, retrieve, and process data; a microprocessor; a microcontroller; a microcomputer; a central processing unit; or any suitable processing device or apparatus.

FIG. 1 is a schematic diagram of a hybrid circuit interrupter 1 (e.g., without limitation, a circuit breaker), in accordance with an example embodiment of the disclosed concept. The circuit interrupter 1 includes a line conductor 2 structured to electrically connect a power source 3 to a load 4. The circuit interrupter 1 is structured to trip open to interrupt current flowing between the power source 3 and load 4 in the event of a fault condition (e.g., without limitation, an overcurrent condition) in order to protect the load 4, circuitry associated with the load 4, as well as the power source 3.

The circuit interrupter 1 further includes a hybrid switch assembly 6, an operating mechanism 8, and an electronic trip unit 10. The hybrid switch assembly 6 in FIG. 1 is a simplified depiction of a hybrid switch intended to demonstrate how current commutates past mechanical separable contacts 12 in a hybrid switch, and is not intended to be limiting on the different types of hybrid switch assemblies that can be included in a hybrid circuit interrupter 1. The hybrid switch assembly 6 comprises a set of mechanical separable contacts 12 and an electronic interrupter 14. The electronic trip unit 10 is structured to monitor power flowing through the circuit interrupter 1 via a current sensor 16 and/or other sensors and to detect fault conditions based on the power flowing through the circuit interrupter 1.

Under normal operating conditions, the mechanical contacts 12 are in a closed state such that they are in contact with one another, enabling current to flow from the power source 3 through the line conductor 2 and the mechanical contacts 12 to the load 4. In addition, the electronic interrupter 14 is powered off under normal operating conditions, such that current cannot flow through the electronic interrupter 14. In response to detecting a fault condition, the electronic trip unit 10 is configured to output a first signal to the electronic interrupter 14, in order to power on the electronic interrupter 14, and to output a second signal to the operating mechanism 8, to initiate actuation of the operating mechanism 8 in order to open the mechanical contacts 12. Powering on the electronic interrupter 14 with the first signal enables the electronic interrupter 14 to commutate fault current from the mechanical contacts 12 to the electronic interrupter 14. The transmission of the second signal from the trip unit 10 to the operating mechanism 8 is timed to ensure that the operating mechanism 8 does not open the mechanical contacts 12 until after the current has been commutated to the electronic interrupter 14, in order to minimize let-through current and the effects of arcing.

Referring now to FIGS. 2-5, sectional views of a portion of a pole assembly 20 that includes an improved multi-part split switch shaft 100 for use with a movable conductor assembly is shown, in accordance with exemplary embodiments of the disclosed concept. The pole assembly 20 can, for example and without limitation, be used in a circuit interrupter such as the hybrid circuit interrupter 1 shown in FIG. 1. The pole assembly 20 includes mechanical separable contacts and a Thomson coil assembly corresponding to the mechanical separable contacts 12 and part of the operating mechanism 8 depicted in FIG. 1. In addition, FIG. 6 shows an exploded view of the components of the split switch shaft 100, in order to better highlight the details of the components, and viewing FIG. 6 in conjunction with any of FIGS. 2-5 may assist in better understanding the details of FIGS. 2-5. It is noted that the line S-S drawn in FIG. 6 indicates the viewing plane of the pole assembly 20 in FIGS. 2-5.

Figure 2:
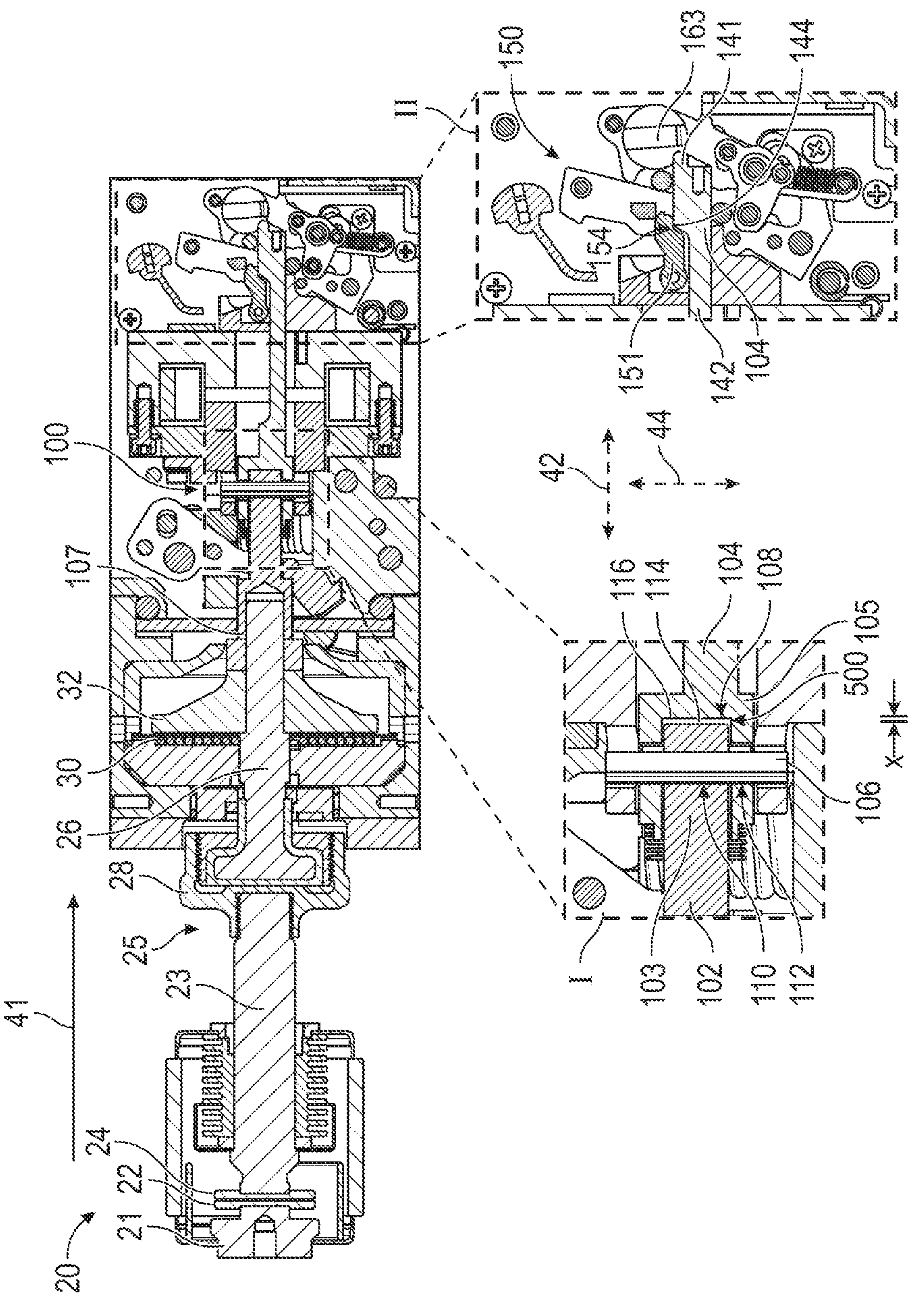
FIG. 2 is sectional view of a portion of a pole assembly that can be used with a circuit interrupter such as the circuit interrupter schematically depicted in FIG. 1 and includes an improved multi-part split switch shaft for use with a movable conductor assembly, showing the separable contacts of the pole assembly in a closed state, in accordance with an example embodiment of the disclosed concept.
Figure 3:
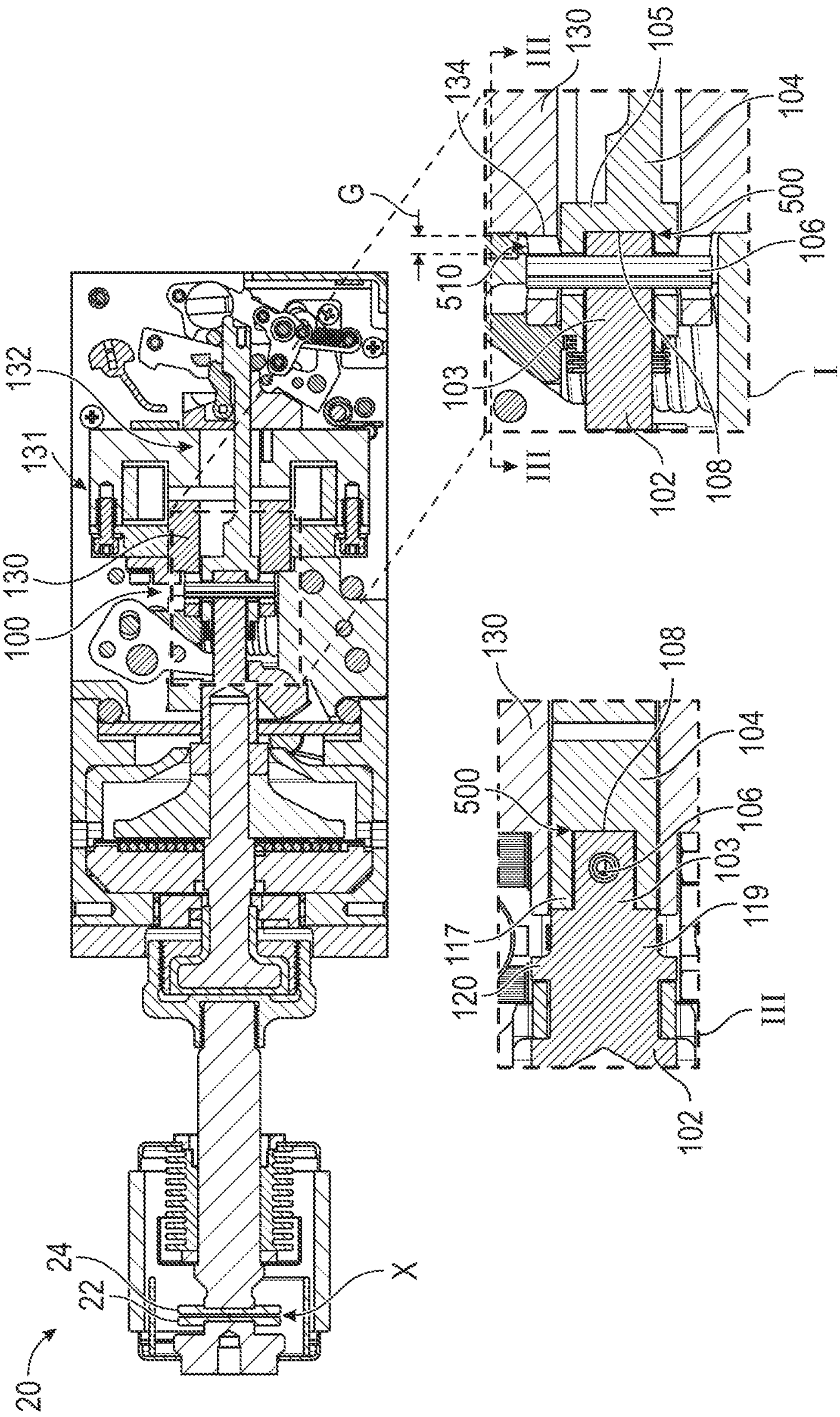
FIG. 3 is the same sectional view of the pole assembly shown in FIG. 2, showing the pole assembly after the separable contacts have separated to an initial gap distance in an initial stage of an opening stroke, in accordance with an example embodiment of the disclosed concept.
Figure 4:
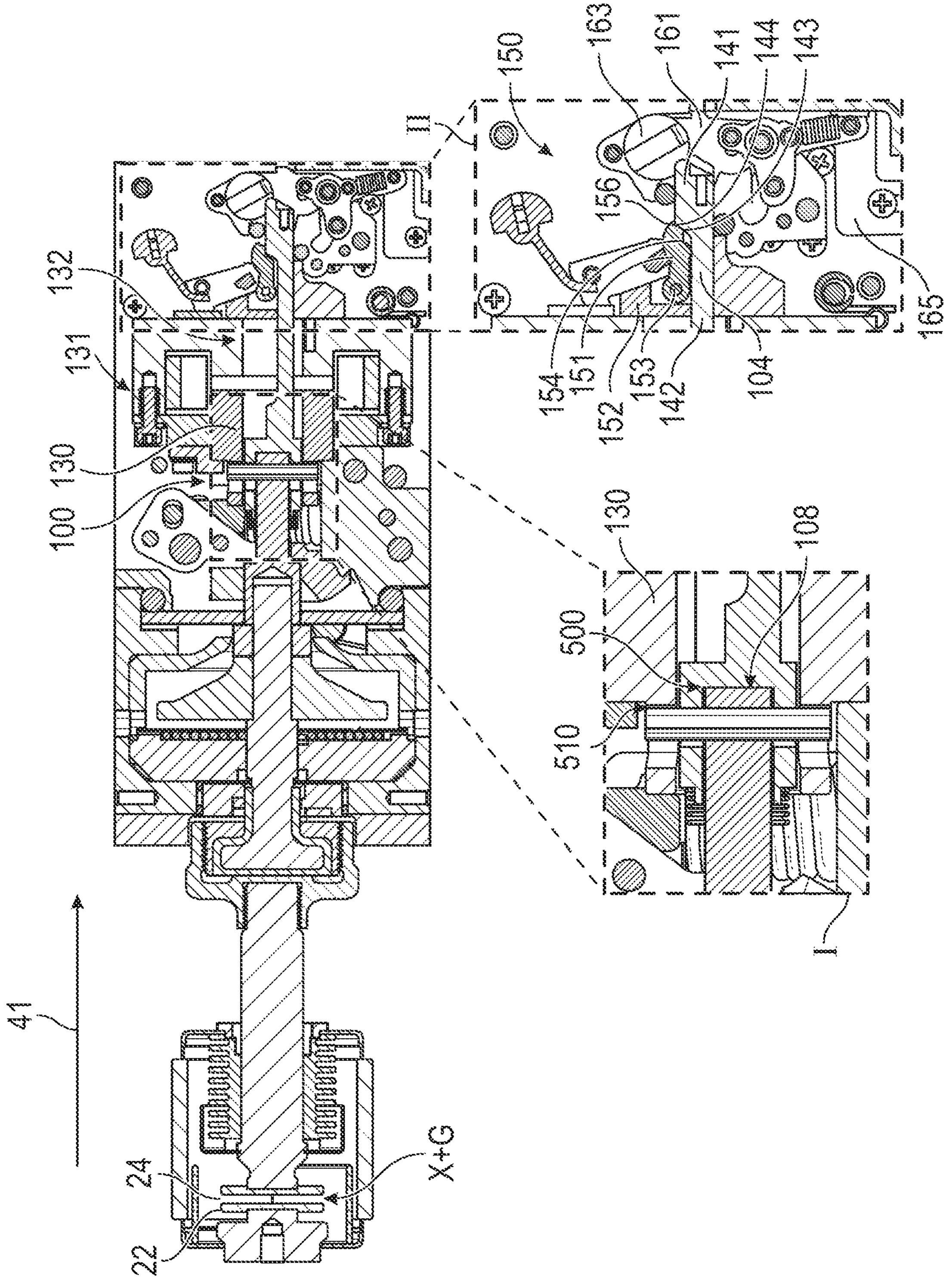
FIG. 4 is the same sectional view of the pole assembly shown in FIG. 3, showing the pole assembly after the separable contacts have separated further during a second stage of an opening stroke and the entire movable assembly coupled to the movable separable contact has been latched in the open position, in accordance with an example embodiment of the disclosed concept.
Figure 5:
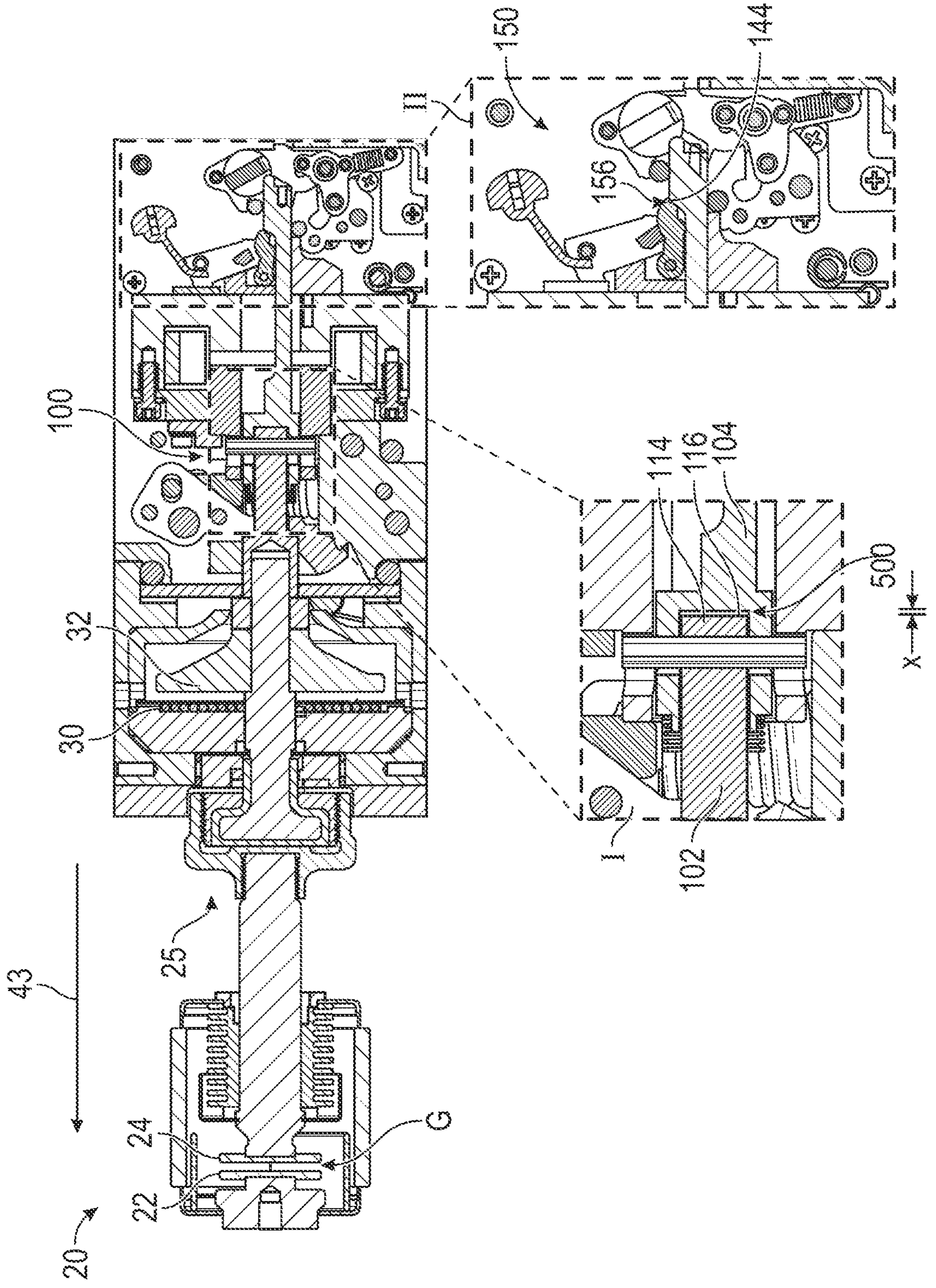
FIG. 5 shows the same sectional view of the pole assembly shown in FIG. 4, showing the pole assembly at an initial stage of re-closing the separable contacts, in accordance with an example embodiment of the disclosed concept.
Figure 6:
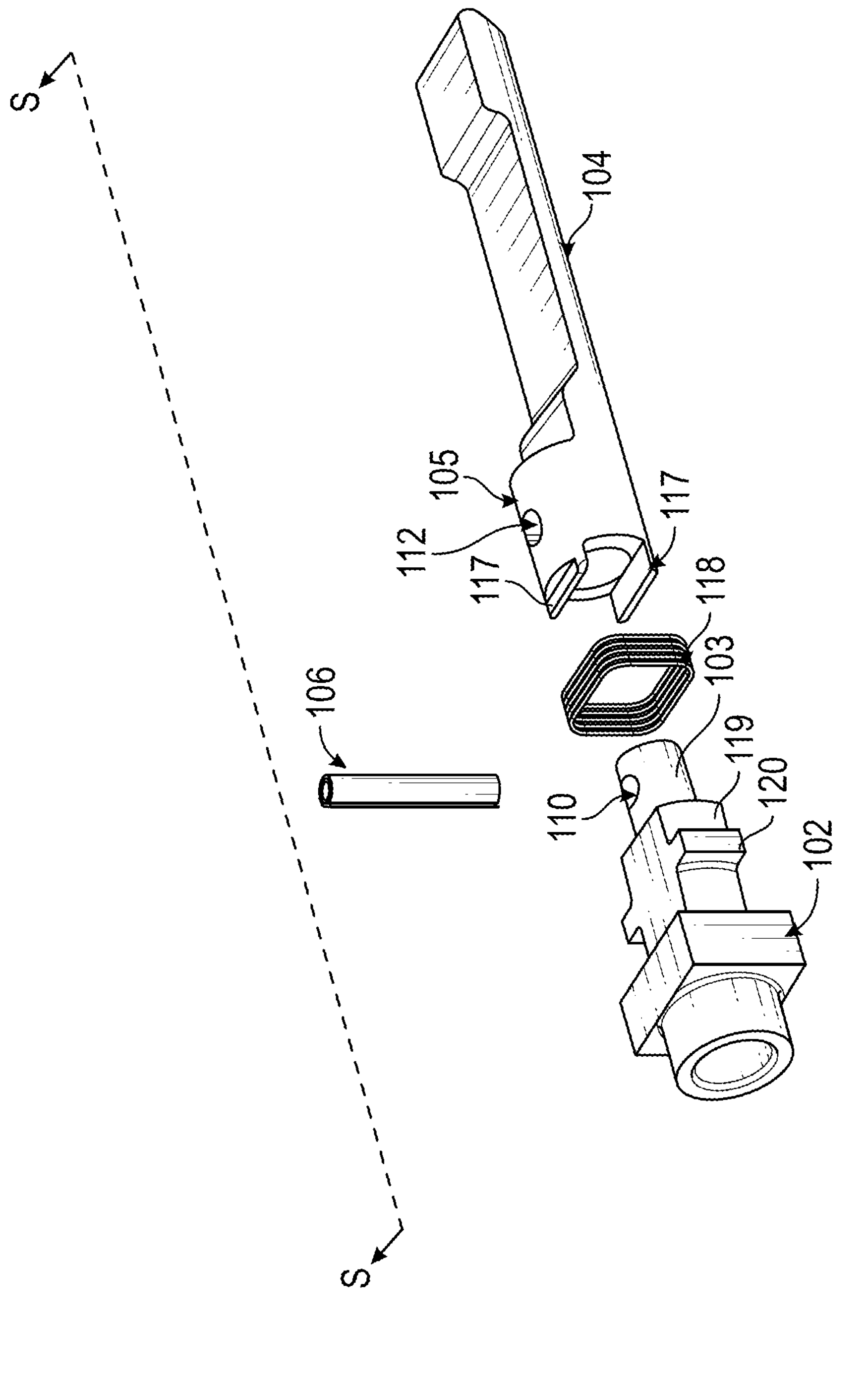
FIG. 6 shows an exploded partial isometric view of the multi-part split switch shaft shown FIGS. 2-5, in accordance with an example embodiment of the disclosed concept.

As detailed further hereinafter, each of FIGS. 2, 3, 4, and 5 show the pole assembly 20 in a distinct stage of an opening stroke. FIG. 2 shows the pole assembly 20 at the beginning of an opening stroke, when the separable contacts 12 are closed. FIG. 3 shows the pole assembly 20 after the movable conductor assembly has traveled an initial distance of 'X' millimeters (mm) such that there is an initial gap of distance 'X' mm between the separable contacts. FIG. 4 shows the pole assembly 20 after the movable conductor assembly has traveled its maximum distance and opened the movable separable contact to its maximum separation gap of distance 'X+G' mm, with the split switch shaft 100 latched by a latching assembly in order to maintain the movable separable contact in its fully open position. FIG. 5 shows the pole assembly 20 after the split switch shaft 100 has started to reset in preparation for re-closing of the separable contacts.

Referring first to FIG. 2, the mechanical contacts of the pole assembly 20 are shown in a closed state. The pole assembly 20 includes a stationary conductor 21 comprising a stationary separable contact 22, and a movable conductor 23 comprising a movable separable contact 24. The stationary separable contact 22 and the movable separable contact 24 correspond to the mechanical contacts 12 depicted in FIG. 1. The movable conductor 23 is part of a larger movable conductor assembly 25 that further includes a drive shaft 26 coupled to the movable conductor 23 by an isolation coupling 28. The pole assembly 20 further includes a Thomson coil arrangement, which includes a Thomson coil 30 that is fixed in position around the drive shaft 26, and a conductive plate 32 that is coupled to the drive shaft 26. Separation of the separable contacts 22, 24 during an opening stroke is achieved when the Thomson coil arrangement drives the movable conductor assembly 25 in the direction indicated by arrow 41. The coil 30 is structured to be connected to a power source (not shown in the figures), and when a time-varying current is supplied to the coil 30, opposing magnetic fields are generated and induced in the coil 30 and conductive plate 32, causing the conductive plate 32 to be repelled by the coil 30 and driving the movable conductor assembly 25 in the direction indicated by arrow 41.

The movable conductor assembly 25 is further coupled to the disclosed split switch shaft 100. An enlargement inset labeled 'I' is shown in FIG. 2 in order to better show the details of the split switch shaft 100. The second enlargement inset labeled 'II' in FIG. 2 is shown in order to better show details of a latching assembly 150 included in the pole assembly 20; however, the latching assembly 150 will be discussed in further detail later herein in conjunction with both FIG. 4 and FIG. 2. Known switch shafts typically comprise a single unitary body, as detailed further later herein in conjunction with FIG. 7. In contrast, the improved switch shaft 100 shown in FIG. 2 and in the enlargement inset I comprises a head shaft 102 and a tail shaft 104 coupled together by a connector pin 106. Specifically, a distal end 103 of the head shaft 102 is coupled to a proximal end 105 of the tail shaft 104.

As an initial matter and prior to discussing the disclosed split switch shaft 100 in further detail, it is noted that, with respect to any given component of the pole assembly 20, the term "proximal" is used hereinafter to refer to an end of the component that is disposed closest to the separable contacts 22, 24, and the term "distal" is used hereinafter to refer to an end of the component that is disposed furthest away from the separable contacts 22, 24. That is, the distal end of a given component is disposed opposite the proximal end of the given component. In addition, the term "proximally" can be used to denote a direction indicating movement toward separable contacts 22, 24, and the term "distally" can be used to denote a direction indicating movement away from the separable contacts 22, 24. Furthermore, the "proximal" and "distal" directions are both "axial" directions, with the "axial" directions being denoted by the arrows 42 in FIG. 2. Travel of the movable conductor assembly 25 in the distal direction can also be referred to travel in the "opening direction", since such travel results in opening of the separable contacts 22, 24. Conversely, when the separable contacts 22, 24 are open and need to be re-closed, travel of the movable conductor assembly 25 in the proximal direction can also be referred to as travel in the "closing direction" 43, which is numbered in FIG. 5. Finally, "lateral" directions refer to the directions disposed orthogonally to the axial directions, denoted by the arrows 44 in FIG. 2.

Continuing to refer to FIG. 2 and the split switch shaft 100, head shaft 102 and tail shaft 104 are structured such that the proximal end 107 of the head shaft 102 is structured to be coupled to the distal end of the drive shaft 26, and the proximal end 105 of the tail shaft 104 is structured to be coupled to the distal end 103 of the head shaft 102. The tail shaft proximal end 105 is formed with a shaft-coupling opening 108 structured to receive the head shaft distal end 103, the shaft-coupling opening 108 being a cutout in the tail shaft proximal end 104 extending from the proximal-most surface of the tail shaft 104 in a distal direction. In addition, the head shaft distal end 103 is formed with a pin receiving opening 110, and the proximal end of the tail shaft 104 is formed with a pin receiving opening 112 that is laterally longer and axially wider than pin receiving opening 110, with the pin receiving openings 110 and 112 extending in a lateral direction across the respective distal end 103 of the head shaft 102 and proximal end 105 of the tail shaft 104. The head shaft distal end 103 and the tail shaft proximal end 105 are each structured such that the pin receiving opening 110 of the head shaft 102 aligns with the pin receiving opening 112 of the tail shaft 104 when the head shaft distal end 103 is inserted into the shaft-coupling opening 108 of the tail shaft proximal end 104

The split switch shaft 100 is structured such that, when the separable contacts 22, 24 are closed, there is a gap 500 (numbered in enlargement inset I in FIG. 2) between the distal-most surface 114 of the head shaft 102 and the distal surface 116 of the shaft-coupling opening 108. It will be appreciated that, as the movable conductor assembly 25 moves in the direction indicated by arrow 41 during an opening stroke, the gap 500 decreases. The gap 500 is at its maximum length when the separable contacts are closed as shown in FIG. 2, and this maximum distance has a length X, with the length X being discussed further herein in connection with FIG. 3.

Referring briefly to FIG. 6, it is noted that the proximal end 105 of the tail shaft 104 is formed with a number of spring mount ledges 117, so that one end of a weak reset spring 118 can be mounted onto the tail shaft proximal end 105. Providing the weak reset spring 118 in this manner has the result of maintaining the gap 500 of maximum length X between the distal-most surface 114 of the head shaft 102 and the distal surface 116 of the shaft-coupling opening 108 (as shown in FIG. 2), when there is no force acting upon the head shaft 102 in the opening direction 41 to overcome the force of the weak reset spring 118. This is because both the head shaft distal end 103 and a spring support portion 119 (positioned immediately proximally relative to the head shaft distal end 103) of the head shaft 102 are structured to fit within the center of the reset spring 118, while a spring stop formation 120 of the head shaft 102 disposed immediately proximally relative to the spring support portion 119 is structured to prevent the reset spring 118 from traveling further proximally relative to the head shaft 102. As can be seen in FIG. 6, the spring stop formation 120 is wider than the spring support portion 119 and the weak reset spring 118 in at least one dimension, thus preventing the weak reset spring from extending proximally beyond the spring stop formation 120.

Referring now to FIG. 3, the pole assembly 20 is shown after the movable conductor assembly 25 has traveled an initial gap distance 'X' in the opening direction 41 during the initial stage of an opening stroke, with the initial gap distance 'X' being equivalent to the length of the gap 500 shown in FIG. 2 (the gap 500 in FIG. 2 being between the distal-most surface 114 of the head shaft 102 and the distal surface 116 of the shaft-coupling opening 108). This initial travel of the movable conductor assembly 25 is denoted in FIG. 3 with the letter 'X' that is used to point to the gap between the separable contacts 22, 24. It is noted that, as a result of the movable conductor assembly 25 having traveled this initial gap distance 'X', the gap 500 that appeared in FIG. 2 between the distal-most surface 114 of the head shaft 102 and the distal surface 116 of the shaft-coupling opening 108 is no longer present in FIG. 3, i.e. the length of the gap 500 between the distal-most surface 114 of the head shaft 102 and the distal surface 116 of the shaft-coupling opening 108 in FIG. 3 is a distance of zero, due to the movable conductor assembly 25 having traveled the initial gap distance 'X' in the opening direction and causing the head shaft 102 to also travel the initial gap distance 'X' in the opening direction in order to close the gap 500.

Still referring to FIG. 3, it is now noted that the pole assembly further includes a shaft support structure 130, such as a solenoid core that is part of a solenoid assembly 131 used for slow opening operations under non-fault conditions, for example and without limitation. The shaft support structure 130 (e.g. solenoid core) stays fixed in position during fast opening operations under fault conditions and comprises a central opening 132 that extends axially such that the tail shaft 104 is received by the support structure central opening 132 and can move axially within the central opening 132 during opening and closing strokes. The lateral width of the central opening 132 is just wide enough to enable the tail shaft 104 to move freely in the opening and closing directions, but narrow enough to prevent the tail shaft 104 from moving laterally. In addition, as labeled in enlargement I in FIG. 3, the shaft support structure 130 comprises a pin receiving opening 134 that is laterally longer and axially wider than the pin receiving opening 112 of tail shaft 104, and that enables the pin 106 to travel axially.

As shown in enlargement I of FIG. 3, after the movable conductor assembly 25 has opened the separable contacts to an initial gap of distance 'X', there still remains a distance 510 that the coupling pin 106 can move in the distal direction within the pin receiving opening 134 of the shaft support structure 130. It is noted that the length of gap 510 in FIG. 3 is a distance G, with distance G being discussed further herein in connection with FIG. 4. In addition, FIG. 3 includes a third enlargement III in addition to enlargement I, and it is noted that the viewing plane of enlargement III is disposed orthogonally to the viewing plane of enlargement I, as indicated by the line III-III in enlargement I in FIG. 3B. Enlargement III shows how, after the movable conductor assembly 25 has opened the separable contacts 22, 24 to the initial gap distance 'X', the spring support portion 119 of the head shaft 102 engages the spring mount ledges 117 of the tail shaft 104 (it will be appreciated that when the separable contacts 22, 24 are closed, the spring support portion 119 and the spring mount ledges 117 are separated by the distance 'X').

Referring now to FIG. 4, the pole assembly 20 is shown after the movable conductor assembly 25 has traveled further a linear distance 'G' in the opening direction 41 during the second stage of an opening stroke, with the distance 'G' being equivalent to the linear length of the gap 510 shown in enlargement I in FIG. 3 (the gap 510 in FIG. 3 being a clearance between a distal edge of the coupling pin 106 and the distal end of the pin receiving opening 134 of the shaft support structure 130). This second distance traveled by the movable conductor assembly 25 is denoted in FIG. 4 with the sum 'X+G' that is used to point to the gap between the separable contacts 22, 24. It is noted that, as a result of the movable conductor assembly 25 having traveled the distance G after having traveled the distance X, the gap 510 that appeared in FIG. 3 between the coupling pin 106 and the distal end of the pin receiving opening 134 of the shaft support structure 130 is no longer present in FIG. 4, i.e. the length of the gap 510 between the coupling pin 106 and the distal end of the pin receiving opening 134 of the shaft support structure 130 in FIG. 4 is a distance of zero, due to the movable conductor assembly 25 having traveled distance G in the opening direction after having traveled distance X in the opening direction.

Still referring to FIG. 4, the enlargement inset II first shown in FIG. 2 is provided again in FIG. 4, in order to show details of a latching assembly 150 of the pole assembly 20, and changes that result in the state of the latching assembly 150 as a result of the movable conductor assembly 25 traveling the distance 'X+G' from the closed position shown in FIG. 2. As a general matter, it is noted that the latching assembly 150 is structured such that, when the distal end of the tail shaft 104 travels far enough in the opening direction, the latching assembly latches the tail shaft 104 in position, in order to maintain the separable contacts 22, 24 in an open state. The latching assembly 150 comprises several components that are configured to sequentially actuate one another in order to fully latch the tail shaft 104 in the open state, but only a few components are discussed herein. The latching assembly 150 is disposed distally relative to the shaft support structure 130 and will be discussed with reference to both FIG. 2 and FIG. 4. In order to prevent the figures from being overly cluttered with reference numbers, more reference numbers are provided in the enlargement inset II of FIG. 4 than are provided in the enlargement inset II of FIG. 2, as some of the reference numbers used to describe the latching assembly 150 are based on components described with respect to FIG. 3.

It is noted that the distal end 141 of the tail shaft 104 is wider than an adjacent portion 142 of the tail shaft 104 disposed immediately proximally to the tail shaft distal end 141. It is noted that the tail shaft portion 142 extends out distally from the distal side of the central opening 132 of the shaft support structure 130. The tail shaft 104 comprises a sloped surface 143 that joins the tail shaft portion 142 to the tail shaft distal end 141. The meeting of the sloped surface 143 with the tail shaft distal end 141 results in the formation of a step 144. The tail shaft step 144 is designed to engage a latch 151 of the latching assembly 150.

The latch assembly 150 comprises a bracket 152, which is fixed in position within the pole assembly 20. The latch 151 is rotationally coupled to the bracket 152 via a rotational pin 153, such that the rotational pin 153 remains fixed in place and enables the latch 151 to rotate around the rotational pin 153. The latch 151 comprises a side that faces toward the sloped surface 143 of the tail shaft 144, and this side is formed with both a closed state notch 154 and an open state notch 156, with the open state notch 156 being disposed axially relative to the closed state notch 154. In FIG. 2, it can be seen that the closed state notch 154 of the latch 151 engages the tail shaft step 144 when the separable contacts 22, 24 are closed. In FIG. 3, it can be seen that after the head movable conductor assembly 25 has traveled distance X in the opening direction and causes the head shaft 102 to also travel distance X in the opening direction in order to close the gap 500, the closed state notch 154 of the latch 151 is still engaged with the tail shaft step 144 (neither the latch 151, the latch closed state notch 154, nor to tail shaft step 144 are numbered in FIG. 3). So, although the movable conductor assembly 25 and head shaft 102 have traveled a distance X in order to separate the separable contacts 22, 24 by an initial gap of length X in FIG. 3, the tail shaft 104 is still disposed in its closed position, i.e. the position that the tail shaft 204 is disposed in even when the separable contacts 22, 24 are closed as shown in FIG. 2.

As expected, it is only when the movable conductor assembly 25 has traveled the distance X+G noted in FIG. 4 that the disposition of the latch 151 changes, which is expected, as the tail shaft 104 is not driven to travel in the opening direction 41 until after the head shaft 102 has closed the gap 500 in FIG. 2. It will be appreciated that, when the coupling pin 106 travels the distance G to meet the distal end of the pin receiving opening 134 of the shaft support structure 130 as shown in FIG. 4, this causes the tail shaft 104 to also travel the distance G in the opening direction 41.

Still referring to the travel of the tail shaft 104 in the opening direction 41 as shown in FIG. 4, it is noted that the latch 151 and the tail shaft step 144 are structured such that travel of the tail shaft 104 in the opening direction 41 from its initial closed position causes the closed state notch 154 of the latch 151 to disengage from the tail shaft step 144. Once the latch closed state notch 154 disengages from the tail shaft step 144, as the tail shaft step 144 is still traveling in the opening direction 41, the latch 151 rotates (i.e. clockwise relative to the view shown in the figures) such that the open state notch 156 then engages the tail shaft step 144, as shown in FIG. 4. At the same time, the distal-most point of the tail shaft distal end 141 has caused a reset lever 161 of the latch assembly 150 to rotate, by pushing against a reset shaft 163 of the reset lever 163. The reset lever 161 is rotationally coupled to another bracket 165 that is fixed in place. The engagement of the tail shaft step 144 with the latch open state notch 156 maintains the tail shaft 104 in its open position until a reset operation is performed to drive the split switch shaft 100 and movable conductor assembly 25 in the closing direction in order to re-close the separable contacts 22, 24.

Referring now to FIG. 5, when it is time to re-close the separable contacts 22, 24, the supply of current to the Thomson coil 30 is turned off in order to deactivate the Thomson coil arrangement. The latching assembly 150 is structured to maintain the tail shaft 104 in its open position until the components of the latching assembly 150 are reset, so when the Thomson coil arrangement is deactivated and no longer exerting force upon the head shaft 102 in the opening direction 41, only the head shaft 102 moves in the closing direction 43, due to the weak reset spring 118 being configured to maintain the gap 500 of length X between the distal-most surface 114 of the head shaft 102 and the distal surface 116 of the shaft-coupling opening 108, as detailed previously herein in conjunction with FIG. 6. The deactivation of the Thomson coil 30 enables the weak reset spring 118 to expand from its compressed state and push the head shaft 102 and the movable conductor assembly 25 the distance X in the closing direction, thus re-establishing the gap 500 of length X between the distal-most surface 114 of the head shaft 102 and the distal surface 116 of the shaft-coupling opening 108 shown in the enlargement inset I of FIG. 2.

Figure 7A:
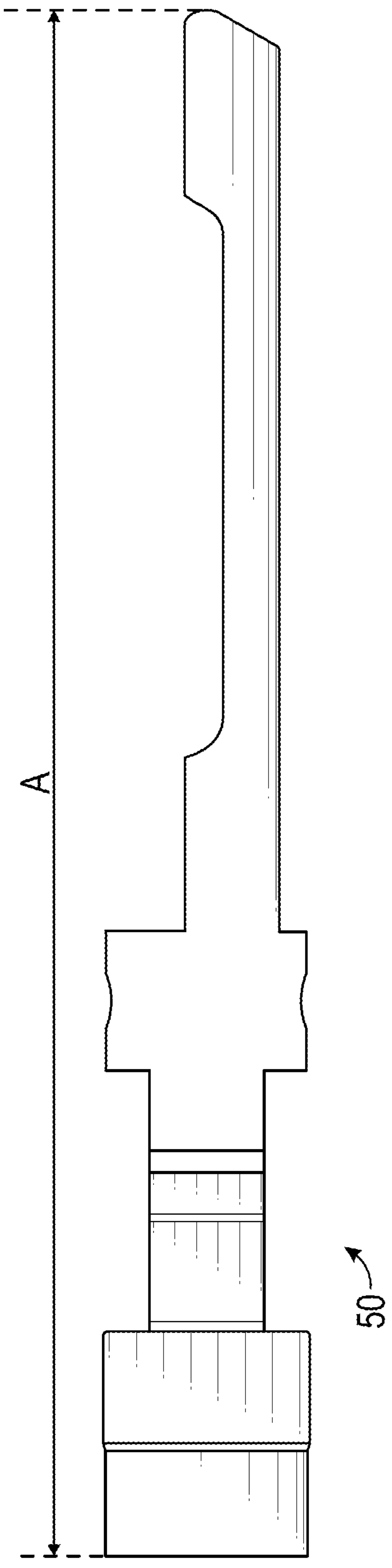
FIG. 7A (Prior Art)
FIG. 7A is an elevation view of a prior art one-piece switch shaft.
Figure 7B:
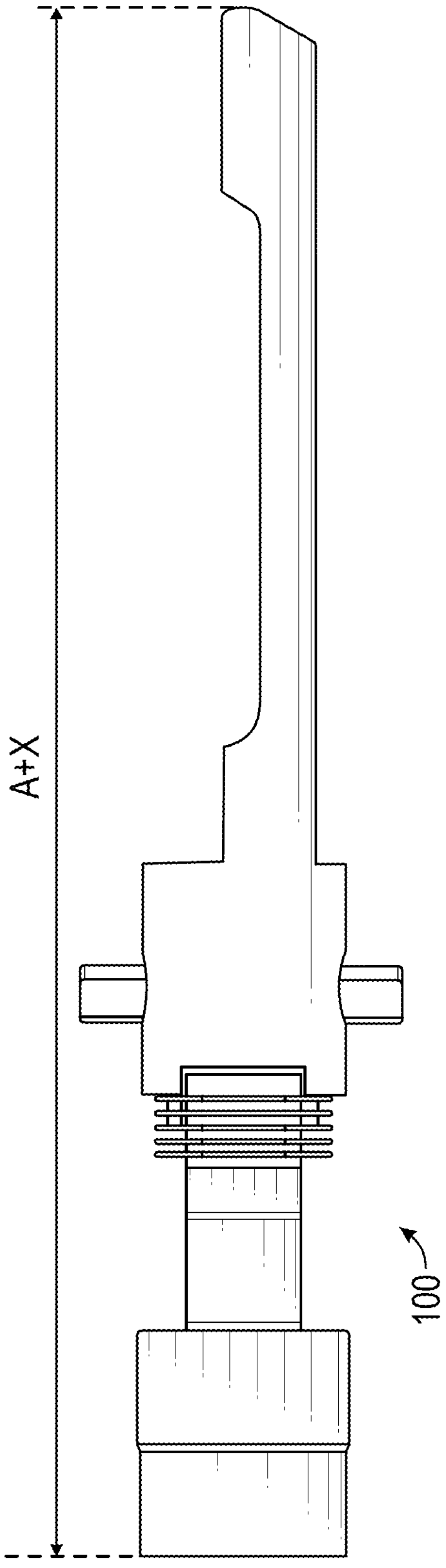
FIG. 7B is an elevation view of the multi-part split switch shaft shown in FIGS. 2-6, shown aligned with the prior art switch shaft shown in FIG. 7A, in order to provide a comparison between the dimensions of the shaft shown in FIGS. 2-6 and the prior art switch shaft shown in FIG. 7A.

Referring now to FIGS. 7A and 7B, a comparison of the disclosed split switch shaft 100 to a prior art single part switch shaft 50 will now be provided in order to highlight the advantageous features of the split switch shaft 100. As shown in FIG. 7A, the prior art single part switch shaft 50 comprises a single unitary body. The length of the single part switch shaft 50 is 'A', while the length of the split switch shaft 100 is 'A+X', with 'X' being attributable to the weak reset spring 118 creating the gap 500 between the distal-most surface 114 of the head shaft 102 and the distal surface 116 of the shaft-coupling opening 108 (as shown in FIG. 2), when the reset spring 118 is uncompressed. The mass of the single part switch shaft 50 is 'M'. The mass of the split switch shaft 100 is also 'M', with the head shaft 102 having mass 0.5M and the tail shaft 104 having mass 0.5M.

If a pole assembly were to use the single-part switch shaft 50 instead of the split switch shaft 100 to open the separable contacts 22, 24 to an acceptable gap under a fault condition using the same movable conductor assembly 25, Thomson coil arrangement, and latching assembly 150 shown in FIGS. 2-5, the entire mass M of the single-part switch shaft 50 would need to travel in the opening direction. In contrast, only the mass 0.5M of the head shaft 102 of the split switch shaft assembly 100 needs to travel in order to open the separable contacts to an acceptable gap under a fault condition, as the distance X is considered a sufficient distance between the separable contacts 22, 24. This means that the split switch shaft assembly 100 achieves a sufficient gap between the separable contacts 22, 24 by moving only half the mass (0.5M) that the single-part switch shaft 50 has to move (M), leading to the split switch shaft 100 opening the separable contacts 22, 24 at a much higher speed and in significantly less time than the single-part switch shaft 50.

The split shaft design of the split switch shaft 100 enables the head shaft 102 to travel the distance 'X' mm with high speed and only engage with tail shaft 104 after an acceptable gap between the separable contacts 22, 24 has been achieved. The engagement of the tail shaft 104 by the head shaft 102 increases the moving mass from 0.5 M to 1.0 M after the travel of 'X' mm, which serves to reduce the momentum of all of the moving parts (both those of the split switch shaft 100 and the movable conductor assembly 25) in the pole assembly 20. It is noted that the mass of the tail shaft 104 can be adjustment depending on the damping needs of a particular application, e.g. the tail shaft 104 can be made to be heavier if higher damping is needed.

In order to both open the separable contacts 22, 24 to an acceptable distance and engage the latching assembly 150 to latch the movable conductor assembly 25 in the open state, the single-part switch shaft 50 has to travel a distance Z during an opening operation. With the split switch shaft 100, since the travel of the head shaft 102 in the opening direction 41 of distance X ensures the sufficient opening of the separable contacts 22, 24, after the head shaft 102 has engaged the tail shaft 104, the tail shaft 104 only needs to travel a distance 'Z−X' in the opening direction 41 to engage the latching assembly 150 in order to latch the movable conductor assembly 25 in the open state.

Figure 8:
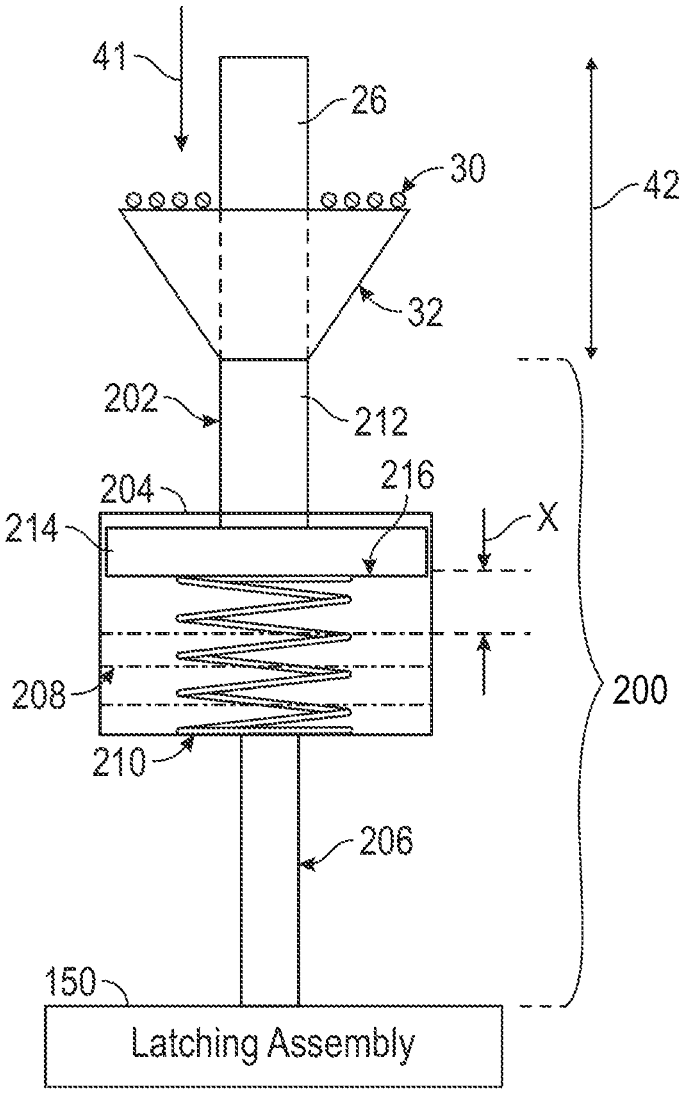
FIG. 8 is a simplified representation of a multi-part moving assembly that can be used instead of the multi-part split switch shaft in a pole assembly such as the pole assembly shown in FIGS. 2-5, in accordance with another example embodiment of the disclosed concept.

Referring now to FIG. 8, a multi-part movable assembly 200 for opening the separable contacts of a circuit interrupter is shown, in accordance with other exemplary embodiments of the disclosed concept. The multi-part movable assembly 200 is for use in a pole assembly including several of the same components of the pole assembly 20 shown in FIGS. 2-5, and the same reference numbers are used in FIG. 8 for components that are common to the pole assembly 20. The components from the pole assembly 20 shown in FIG. 8 include the drive shaft 26, the Thomson coil 30, the conductive plate 32, and the latching assembly 150. It should be noted that the drive shaft 26 shown in FIG. 8 can be coupled to the movable conductor 23 as part of a movable conductor assembly 25 as shown in FIGS. 2-5, and that the movable conductor assembly 25 can be arranged relative to the stationary conductor 21 as shown in FIGS. 2-5. It is noted that FIG. 8 depicts the multi-part movable assembly 200 in a closed position, i.e. a position in which the separable contacts 22, 24 are closed.

In FIG. 8, the multi-part movable assembly 200 comprises a piston 202, a hydraulic enclosure 204, and a switch shaft 206. The hydraulic enclosure 204 houses hydraulic fluid 208 and a reset spring 210 structured to be compressed and expand in the axial directions 42. The hydraulic fluid 208 sits on the proximal surface of the distal end of the hydraulic enclosure 204, and the reset spring 210 is positioned so that distal end of the spring 210 engages the proximal surface of the distal end of the hydraulic enclosure 204 and so that the proximal end of the spring 210 engages the distal surface of the piston crown 214, such that at least a portion of the reset spring 210 is submerged in the hydraulic fluid 208 at all times.

A connecting rod 212 of the piston 202 is coupled at its proximal end to the distal end of the conductive plate 32. The amount of hydraulic fluid 208 and length of the reset spring 210 are chosen so that, when the reset spring 210 is in its uncompressed state, the length of the reset spring 210 that extends proximally out of the hydraulic fluid 208 is either equal to or greater in length than the distance that the movable separable contact 24 needs to travel under a fault condition during a successful opening operation. This length is referred to hereinafter as the clearance distance of the reset spring 210. In an exemplary embodiment, the clearance distance of the reset spring 210 is chosen to be between 1.0 and 1.5 mm. This clearance distance is indicated as distance 'X' in FIG. 8.

The proximal end of the switch shaft 206 is coupled to the distal end of the hydraulic enclosure 204, and the distal end of the switch shaft 206 engages a latching assembly 150. The switch shaft 206 can be a single-part switch shaft such as the single-part switch shaft 50 shown in FIG. 7A. When the Thomson coil 30 is activated to initiate an opening stroke, the movable conductor 23, the drive shaft 26, the conductive plate 32, and the piston 202 all travel in the opening direction 41 to compress the reset spring 210. The hydraulic enclosure 204 is structured to move axially, and once the reset spring 210 is fully compressed, the opening forces of the movable conductor 23, the drive shaft 26, the conductive plate 32, and the piston 202 drive the hydraulic enclosure 202 and the switch shaft 206 in the opening direction 41, thus actuating the latching assembly 150 to latch all of the moving components of the multi-part moving assembly 200 in the open state.

It is noted that when the Thomson coil 30 is activated, the movable conductor 23, the drive shaft 26, the conductive plate 32, and the piston 202 all initially travel at high speed until the reset spring 210 has been compressed the clearance distance of 'X' mm. After the reset spring 210 has been compressed the clearance distance 'X' mm, the speed of the moving components is damped once the piston 202 is forced further distally into the hydraulic fluid 208. Once the reset spring 210 has been fully compressed, The multi-part moving assembly 200 is similar to the split switch shaft 100 in that the design of the multi-part moving assembly 200 enables a first portion of a pole assembly (the first portion including the movable conductor 23, the drive shaft 26, the conductive plate 32, and the piston 202) to initially travel the distance 'X' mm with high speed in order to achieve the initial gap of 'X' between the separable contacts 22, 24 before engaging a second portion of the pole assembly 200 (the hydraulic fluid 208, the hydraulic enclosure 204, and the switch shaft 206) to dampen the high speed movement of the first portion before the latching assembly 150 latches all of the moving components in the open state. As with the split switch shaft 100, the multi-part moving assembly 200 reduces the mass of the components in a pole assembly that need to travel at high speed to achieve the initial separation between the separable contacts 22, 24 by requiring only a first portion of a pole assembly to travel at high speeds, and letting the second portion of the pole assembly dampen the movement of the first portion once the first portion has engaged the second portion. It will be appreciated that structuring a pole assembly in this manner enables the separable contacts 22, 24 to be opened to the initial gap of 'X' mm with much less force than would be needed if both the first portion and second portion were required to travel the distance of 'X'.

It is noted that additional embodiments result from implementing variations of the multi-part moving assembly 200. In one non-limiting example, the hydraulic system is replaced with a damper assembly that can additionally dissipate energy if required. This system exhibits behavior similar to that of the moving assembly 200 but with more energy dissipation, which is useful in contexts requiring increased structural strength. In another non-limiting example, the hydraulic system is replaced with solid momentum-receiving components, with the conductive plate 32 being coupled at its distal side to a solid component that can withstand high impact, and with there being a gap between the component coupled to the conductive plate 32 and the momentum-receiving components, such that during an opening stroke, an impact occurs between the solid component coupled to the conductive plate 32 and the momentum-receiving components. Some momentum is transferred to the momentum-receiving components from the solid component that is coupled to the conductive plate 32, and both sets of components then move in the same direction and are subsequently latched.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A split switch shaft for use in a pole assembly of a circuit interrupter, the pole assembly comprising a shaft support structure with an axially extending central opening, a stationary conductor with a stationary separable contact and a movable conductor assembly with a movable separable contact, the movable conductor assembly being structured to travel in an opening direction from a closed state during an opening stroke in order to separate the movable separable contact from the stationary separable contact, the split switch shaft comprising:

a head shaft structured to be coupled at its proximal end to the movable conductor assembly, the head shaft comprising:

a first pin receiving opening extending laterally through a distal end of the head shaft;

a sliding pin;

a tail shaft, the tail shaft comprising:

a proximal end coupled to the head shaft distal end, the tail shaft proximal end comprising:

a plurality of spring mount ledges; and a shaft-coupling opening extending laterally between the spring mount ledges; and a second pin receiving opening extending laterally through the tail shaft proximal end; and a reset spring mounted on the spring mount ledges, wherein the head shaft distal end is inserted into the tail shaft proximal end such that the first and second pin receiving openings are aligned, wherein the sliding pin is inserted into the first and second pin receiving openings, wherein the reset spring maintains an initial gap distance between a distal-most surface of the head shaft and a distal surface of the shaft-coupling opening absent any compression forces acting upon the reset spring, wherein the second pin receiving opening is laterally longer than the first pin receiving opening, wherein the head shaft is structured to travel the initial gap distance in the opening direction when the movable conductor assembly travels the initial gap distance in the opening direction during an opening stroke, and wherein the tail shaft is structured to remain stationary when the movable conductor assembly travels the initial gap distance in the opening direction from the closed state during an opening stroke.

2. The split switch shaft of claim 1, wherein the second pin receiving opening is axially wider than the first pin receiving opening and structured such that, when the movable conductor assembly is in the closed state, the sliding pin engages a proximal end of the second pin receiving opening.

3. The split switch shaft of claim 2, wherein the tail shaft is structured such that, after the movable conductor assembly travels the initial gap distance during an opening stroke, the sliding pin is disposed the initial gap distance away from the proximal end of the second pin opening.

4. The split switch shaft of claim 3, wherein the head shaft and the distal surface of the tail shaft are structured such that, after the movable conductor assembly travels the initial gap distance during an opening stroke, the distal-most surface of the head shaft engages the distal surface of the shaft-coupling opening.

5. The split switch shaft of claim 4, wherein the second pin receiving opening is structured to prevent the tail shaft from traveling in the opening direction before the movable conductor assembly has traveled the initial gap distance in the opening direction from the closed state, and wherein the tail shaft is structured to be inserted within the central opening of the shaft support structure such that the switch shaft can travel in the opening direction to engage a latching assembly to latch the movable conductor assembly in an open state after the movable conductor assembly travels the initial gap distance during an opening stroke.

6. A pole assembly for a circuit interrupter, the pole assembly comprising:

a stationary conductor with a stationary separable contact;

a movable conductor assembly with a movable separable contact;

a Thomson coil actuator structured to cause the movable conductor assembly to travel in an opening direction from a closed state during an opening stroke in order to separate the movable separable contact from the stationary separable contact;

a shaft support structure with an axially extending central opening; and a split switch shaft, the split switch shaft comprising:

a head shaft structured to be coupled at its proximal end to the movable conductor assembly, the head shaft comprising:

a first pin receiving opening extending laterally through a distal end of the head shaft;

a sliding pin;

a tail shaft, the tail shaft comprising:

a proximal end coupled to the head shaft distal end, the tail shaft proximal end comprising:

a plurality of spring mount ledges; and a shaft-coupling opening extending laterally between the spring mount ledges; and a second pin receiving opening extending laterally through the tail shaft proximal end; and a reset spring mounted on the spring mount ledges, wherein the head shaft distal end is inserted into the tail shaft proximal end such that the first and second pin receiving openings are aligned, wherein the sliding pin is inserted into the first and second pin receiving openings, wherein the reset spring maintains an initial gap distance between a distal-most surface of the head shaft and a distal surface of the shaft-coupling opening absent any compression forces acting upon the reset spring, wherein the second pin receiving opening is laterally longer than the first pin receiving opening, wherein the head shaft is structured to travel the initial gap distance in the opening direction when the movable conductor assembly travels the initial gap distance in the opening direction during an opening stroke, and wherein the tail shaft is structured to remain stationary when the movable conductor assembly travels the initial gap distance in the opening direction from the closed state during an opening stroke.

7. The pole assembly of claim 6, wherein the second pin receiving opening is axially wider than the first pin receiving opening and structured such that, when the movable conductor assembly is in a closed state, the sliding pin engages a proximal end of the second pin receiving opening.

8. The pole assembly of claim 7, further comprising:

a latching assembly structured to latch the movable conductor assembly in an open state when engaged by the tail shaft, wherein the shaft support structure comprises a third pin receiving opening that is laterally longer than the second pin receiving opening, wherein the tail shaft is inserted into the central opening of the shaft support structure such that the first, second, and third pin receiving openings are aligned, wherein the third pin receiving opening is structured such that, after the movable conductor assembly travels the initial gap distance during an opening stroke, the sliding pin is disposed the initial gap distance away from the proximal end of the second pin opening and is disposed a latching distance away from a distal end of the third pin receiving opening.

9. The pole assembly of claim 8, wherein the head shaft and the tail shaft are structured such that, after the movable conductor assembly travels the initial gap distance during an opening stroke, the distal-most surface of the head shaft engages the distal surface of the shaft-coupling opening.

10. The pole assembly of claim 9, wherein the second pin receiving opening is structured to prevent the tail shaft from traveling in the opening direction before the movable conductor assembly has traveled the initial gap distance in the opening direction from the closed state.

11. The pole assembly of claim 10, wherein the switch shaft is structured such that, after the movable conductor assembly travels the initial gap distance during an opening stroke, the tail shaft must travel the latching distance in order to engage the latching assembly to latch the movable conductor assembly in the open state.

12. The pole assembly of claim 10, wherein the third pin receiving opening is structured such that, when the tail shaft engages the latching assembly, the sliding pin engages a distal end of the third pin receiving opening.

13. The pole assembly of claim 12, wherein the switch shaft is structured such that, when the tail shaft is engaging the latching assembly and a force exerted upon the head shaft in the opening direction is removed, the reset spring expands to restore the initial gap distance between the distal-most surface of the head shaft and the distal surface of the shaft-coupling opening.

* * * * *